United States Patent [19]

Kennelly

[11] Patent Number: 5,725,380
[45] Date of Patent: Mar. 10, 1998

[54] COMBINATION WRITING BOARD AND ABACUS

[76] Inventor: Kim Kennelly, 140 Ingrid Pl., Oldsmar, Fla. 34677

[21] Appl. No.: 783,118

[22] Filed: Jan. 14, 1997

[51] Int. Cl.⁶ .................. G06C 1/00; G09B 1/02; G09B 19/02
[52] U.S. Cl. .................. 434/203; 434/192
[58] Field of Search .................. 434/203, 204, 434/192, 200, 191, 188

[56] References Cited

U.S. PATENT DOCUMENTS

| 271,749 | 2/1883 | Saewart | 434/192 |
| 580,516 | 4/1897 | Andrew | 434/203 |
| 1,142,651 | 6/1915 | Winiecki | 434/203 |

FOREIGN PATENT DOCUMENTS

| 59455 | 6/1913 | Austria | 434/203 |
| 713104 | 10/1931 | France | 434/203 |
| 836136 | 7/1949 | Germany | 434/203 |
| 596068 | 8/1959 | Italy | 434/203 |
| 12314 | 4/1908 | United Kingdom | 434/203 |

*Primary Examiner*—Paul J. Hirsch
*Attorney, Agent, or Firm*—Ronald E. Smith

[57] ABSTRACT

A portable and foldable teaching aid combines an abacus and an inclined writing surface. The abacus helps teach math skills and the inclined writing surface helps strengthen hand and wrist muscles that are used in writing. The abacus and writing board are positioned in physical proximity to one another to encourage children to write down math problems on the writing board, to solve them on the abacus, and to write down the answer on the writing board. The writing board may be of the dry erase type, the chalkboard type, or any other suitable, erasable writing surface. It may also be magnetized to hold letters, shapes, and the like. The writing board is releasably attached to support rods so that it can be separated from them when the device is folded for storage. When folded, it can be carried separately or placed into a child's backpack.

15 Claims, 3 Drawing Sheets

5,725,380

COMBINATION WRITING BOARD AND ABACUS

BACKGROUND OF THE INVENTION

1. Field of the Invention

This invention relates, generally, to teaching and learning tools. More particularly, it relates to a foldable, portable apparatus that combines an inclined writing board with an abacus means.

2. Description of the Prior Art

Both writing boards and abacuses are well-known. However, writing boards are usually positioned in a vertical plane, such as a chalkboard, or a substantially horizontal plane, such as a common school desk. Children just learning to write often learn poor writing habits when forced to learn on such surfaces. Researchers have found that certain muscles in the hand and wrist, used when writing properly, are poorly developed in modern day children. As a consequence, many children try to write by moving their entire arms when forming letters. Since the large motor muscles of the arm are poorly adapted to the intricate movements required during letter formation, these children are unable to write with any degree of success. Moreover, researchers have found that children's hand and wrist muscles are exercised and made stronger if a child learns to write on an inclined writing surface.

What is needed, then, is a writing surface that is inclined from the horizontal at an angle beneficial to proper development of the hand and wrist muscles.

Some children also have trouble learning simple math skills such as adding and subtracting. Researchers have found that children can acquire these skills with less difficulty by using an abacus. An abacus has counting beads arranged on vertically disposed or horizontally disposed rods, and arithmetic calculations can be made on them by sliding the beads along the rods. Thus, a child learning arithmetic with the aid of an abacus enjoys the visual appearance of the abacus because the beads, especially if brightly colored, are attractive. The child also enjoys the tactile sensation of sliding the beads along the rods. The beads make pleasant clicking sounds as they bump into one another as well. Thus, use of an abacus employs several of the child's senses, so that learning takes place in a fun environment. Moreover, a child who adds numbers together on an abacus and sees the answer displayed in an easy to read format begins to understand better how numbers work. Thus, it would be beneficial to teachers and their students if a teaching aid were available that combined an inclined writing board with an abacus. Ideally, such a device should be portable so that the child could take it home for homework purposes. It should also be foldable so that it would fit easily within a child's backpack. Moreover, it should also be made of safe, durable materials and be inexpensive to manufacture.

However, in view of the art considered as a whole at the time the present invention was made, it was not obvious to those of ordinary skill in this art how the needed teaching aid could be provided.

SUMMARY OF THE INVENTION

The present invention provides a new, useful, and nonobvious teaching aid that combines an abacus means and a writing board inclined at an optimal angle.

The teaching aid has two configurations: unfolded and folded. In its first or operable configuration, it is unfolded and ready for use, i.e., it is deployed. In its second configuration, it is folded for storage.

Structurally speaking, the teaching aid has two primary parts that are disposed orthogonally with respect to one another when the device is in its deployed configuration and which are disposed in coplanar relation to one another when the device is folded into its storage configuration.

More particularly, the device includes a first pair of parallel, transversely spaced apart frame members; each frame member of the first pair of frame members has a forward end and a rearward end.

A second pair of parallel, transversely spaced apart frame members are connected to respective rearward ends of the frame members of the first pair of frame members, and a lower support rod for supporting a first end of a flat writing board has its opposite ends secured to respective forward ends of the first pair of frame members.

An upper support rod for supporting a second end of the writing board has its opposite ends secured to the respective frame members of the second pair of frame members at respective preselected points between opposite ends of the respective frame members of the second pair of frame members.

The flat writing board supported by the upper and lower support rods may be a dry erase board, a chalkboard, or the like. It may also be magnetized so that it holds magnetized objects while still permitting writing thereupon.

An abacus means is supported by the frame members of the second pair of frame members. The abacus means includes a plurality of parallel rods having their respective opposite ends connected to the second pair of frame members, and a plurality of beads is slideably mounted on each of the rods.

The upper support rod is positioned at an elevation higher than the lower support rod so that the writing board is inclined at a predetermined angle with respect to a horizontal plane when the teaching aid is supported on a horizontal support surface. If the writing board is inclined at about a thirty degree angle, it helps strengthen the muscles needed for good penmanship.

The connection between the first and second pair of frame members is a pivotal connection so that the second pair of frame members is foldable into coplanar relation to the first pair of frame members when it is desired to place the aid into storage. Its small size permits its introduction, when folded, into a child's backpack.

Releasable fastening means are provided for detachably securing the writing board to the lower and upper support rods when the teaching aid is deployed in its operable configuration. The writing board, when attached to the lower and upper support rods, serves to lock the teaching aid into said operable configuration. When the writing board is detached from its support rods, the teaching aid may be folded for storage.

The fastening means may include a strip of hook and loop fastening material secured to the lower and upper support rods and a mating pair of strips of hook and loop fastening material secured in spaced relation to one another to an underside of the writing board in registration with the upper and lower support rods, i.e., the mating pair of strips is positioned at opposite ends of the writing board.

The writing board is also detachably secured to the upper and lower support rods when the teaching aid is in a folded configuration by a third strip of hook and loop fastening material that is secured to an underside of the writing board, said third strip of fastening material being positioned between the pair of strips that are positioned at opposite ends of the writing board and the third strip being in registration with the strip of material secured to the upper support rod when the teaching aid is disposed in its folded configuration.

A writing pen is detachably secured to a preselected frame member by a strip of hook and loop fastening material secured to the preselected frame member and a mating strip of hook and loop fastening material secured to the pen.

The upper support rod is rotatably mounted relative to the second pair of frame members so that the upper support rod is in a first rotational position when the teaching aid is deployed in its operable configuration and so that the upper support rod is in a second rotational position when the teaching aid is disposed in its folded configuration.

It is a primary object of this invention to provide a writing board that is inclined at an angle that develops the wrist and hand muscles that children need to develop in order to master writing skills.

Another object is to provide an abacus means in combination with an inclined writing board to improve a child's arithmetic abilities in conjunction with improvements to the child's writing abilities.

These and other important objects, features, and advantages of the invention will become apparent as this description proceeds.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
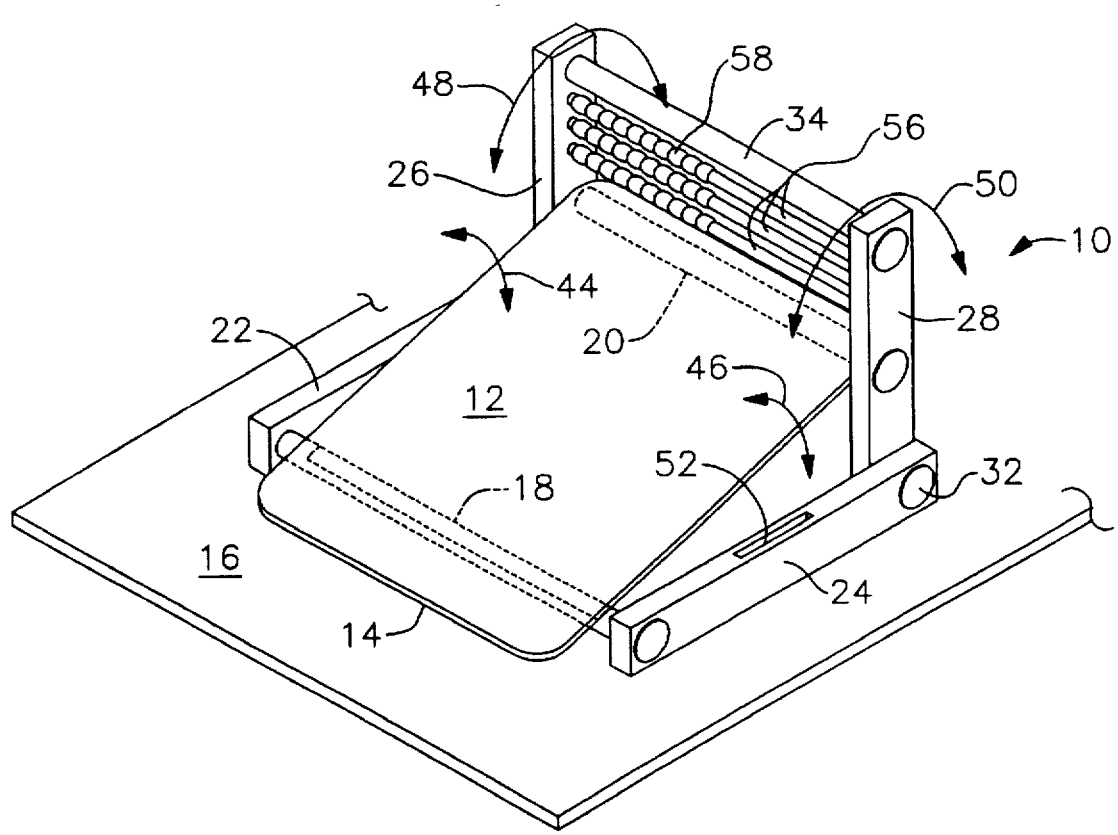
FIG. 1 is a perspective view of an illustrative embodiment of the invention when in its operable configuration.

Referring now to FIG. 1, it will there be seen that an exemplary embodiment of the invention is denoted as a whole by the reference numeral 10.

Teaching aid 10 includes a flat writing board 12 that is positioned at approximately thirty degrees (30°) from a horizontal plane when in its operable configuration as depicted. Lower edge 14 of board 12 extends to or almost to support surface 16 so that the child's hand can rest comfortably upon said support surface when writing near said lower edge 14. However, most of the time the child's hand and wrist will be comfortably supported by writing surface 12 itself.

Writing surface 12 may be a dry erase board, a chalkboard, or the like. It may also be magnetized so that magnetic letters, numbers, pictures, geometric figures, miscellaneous designs, and the like may be arranged on said surface in any pattern.

The lower end of board 12 is supported by a transversely disposed lower support rod 18 and the upper or elevated end of said board is supported by transversely disposed upper support rod 20.

The opposite ends of lower support rod 18 are nonrotatably secured to the respective forward ends of parallel, longitudinally disposed frame members 22, 24 and the opposite ends of upper support rod 20 are rotatably or nonrotatably secured to frame members 26, 28 at a preselected point between the opposite ends of said frame members as depicted. Frame members 26, 28 are disposed in parallel relation to one another and are pivotally secured at their respective lowermost ends to the rearward ends of frame members 22, 24 as at 30, 32; reference numeral 30 appears in FIG. 2.

The uppermost ends of frame members 26, 28 are interconnected to one another by a transversely disposed frame member 34. The structural integrity of teaching aid 10 is not seriously compromised if said frame member 34 is deleted.

Figure 2:
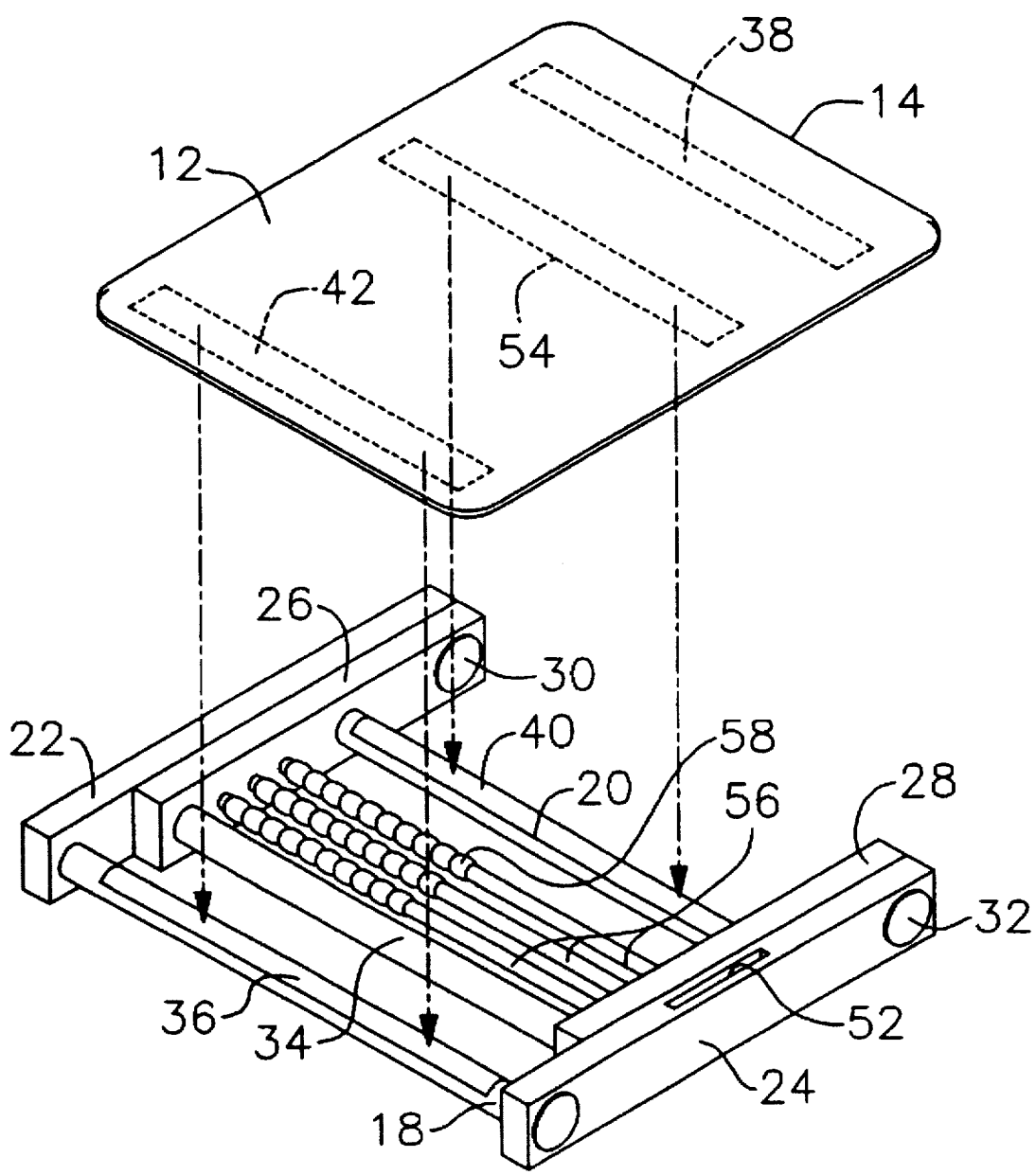
FIG. 2 is an exploded perspective view of the device when in its folded configuration.

Board 12 may be detachably secured to upper and lower support rods 18 and 20 by any number of fastening means. For example, a fabric material 36 (FIG. 2) having hooks formed thereon may be adhered to lower support rod 18 and a fabric material 38 (FIG. 2) having hook-engaging loops formed thereon may be adhered to the underside of board 12. Thus, when board 12 is deployed in its operable configuration as depicted in FIG. 1, fabric strips 36 and 38 would releasably mate with one another. FIG. 2 depicts board 12 in a reversed position, relative to its FIG. 1 position.

Similarly, a fabric strip 40 (FIG. 2) of hook and loop-type fastening material could be adhered to upper support rod 20 and a mating strip 42 of such material could be adhered to the underside of board 12. Again, the position of board 12 in FIG. 2 is reversed relative to its FIG. 1 position.

Magnetic fastening means, not shown, would also be feasible for releasably securing the opposite ends of board 12 to support rods 18 and 20, as would snaps and buckles, strings, and the like.

Double-headed directional arrows 44, 46 in FIG. 1 indicate that board 12 may be separated from support rods 18 and 20. Note that board 12 locks teaching aid 10 into its operable configuration when said board is secured to said support rods, and that folding of device 10 into its FIG. 2 position requires detachment of said board from said support rods.

Double-headed directional arrows 48, 50 in said Figure indicate that pivotally-mounted frame members 26, 28 may be folded rearwardly or forwardly from their respective FIG. 1 positions after board 12 has been detached from support rods 18 and 20. FIG. 2 depicts teaching aid 10 when frame members 26, 28 have been folded forwardly into coplanar relation with frame members 22, 24; this is the preferred storage position of aid 10. When so folded, it will fit into a child's backpack. Moreover, when so folded a plurality of such teaching aids 10 may be vertically stacked for storage purposes in a classroom.

Reference numeral 52 denotes a hook and loop strip of fastening material that may be altered to either frame member 22 or 24; a mating strip of material is adhered to a writing implement, not shown, so that said writing implement is detachably secureable to said strip 52 when not in use.

As indicated in FIG. 2, mother strip 54 of hook and loop fastening material is secured to the underside of board 12, between strips 38 and 42; strip 54 mates with strip 40 on upper support rod 20 when device 10 is folded for storage as depicted in FIG. 2 and when board 12 is oriented in the manner depicted in said FIG. 2.

In the embodiment of FIGS. 1 and 2, the abacus means of this invention is provided in the form of three parallel rods, collectively denoted 56; the respective opposite ends of rods 56 are nonrotatably secured to frame members 26, 28. A set of ten beads, collectively denoted 58, is slideably molted on each rod 56. Preferably, each set of beads on a rod has a common color, but the colors of the respective sets differ from one another.

The arithmetical methods for using the beads are well-known, form no part of the invention, per se, and therefore need not be described in detail here. Briefly, the lowermost row of beads is treated as representing the "ones" position of numerals, the middle row is treated as representing the "tens" position, and the uppermost row is treated as representing the "hundreds" position. Various arithmetical calculations can be performed based upon such definitions.

Although not shown, a classic Chinese abacus having vertically-stacked beads could be employed instead of the horizontally deployed beads of this particular embodiment. In the case of a Chinese abacus, a right angle would be formed in frame members 26, 28 at a point above upper support rod 20 so that the rods would lie in a horizontal plane. The type of abacus is not critical to this invention; the important contribution is the combination of an abacus means and an inclined writing board in close proximity to one another.

More particularly, the close proximity of the abacus means and the writing board encourages children to use both of them. A math problem can first be spoken by a teacher, and then written down by a child on board 12. The abacus means may then be employed by the child to solve the problem, and the child may write down the solution, as generated by the abacus, on the board. In this way, both components of teaching aid 10 are used by the child. The child's hand and wrist muscles are strengthened as needed by the inclination of board 12, thereby improving the child's ability to write, and the child's math and analytical abilities are strengthened by manipulation of the abacus means.

Even the mechanical aspects of folding and unfolding device 10 and attaching and detaching board 12 help teach the child how mechanical devices work.

Figure 3:
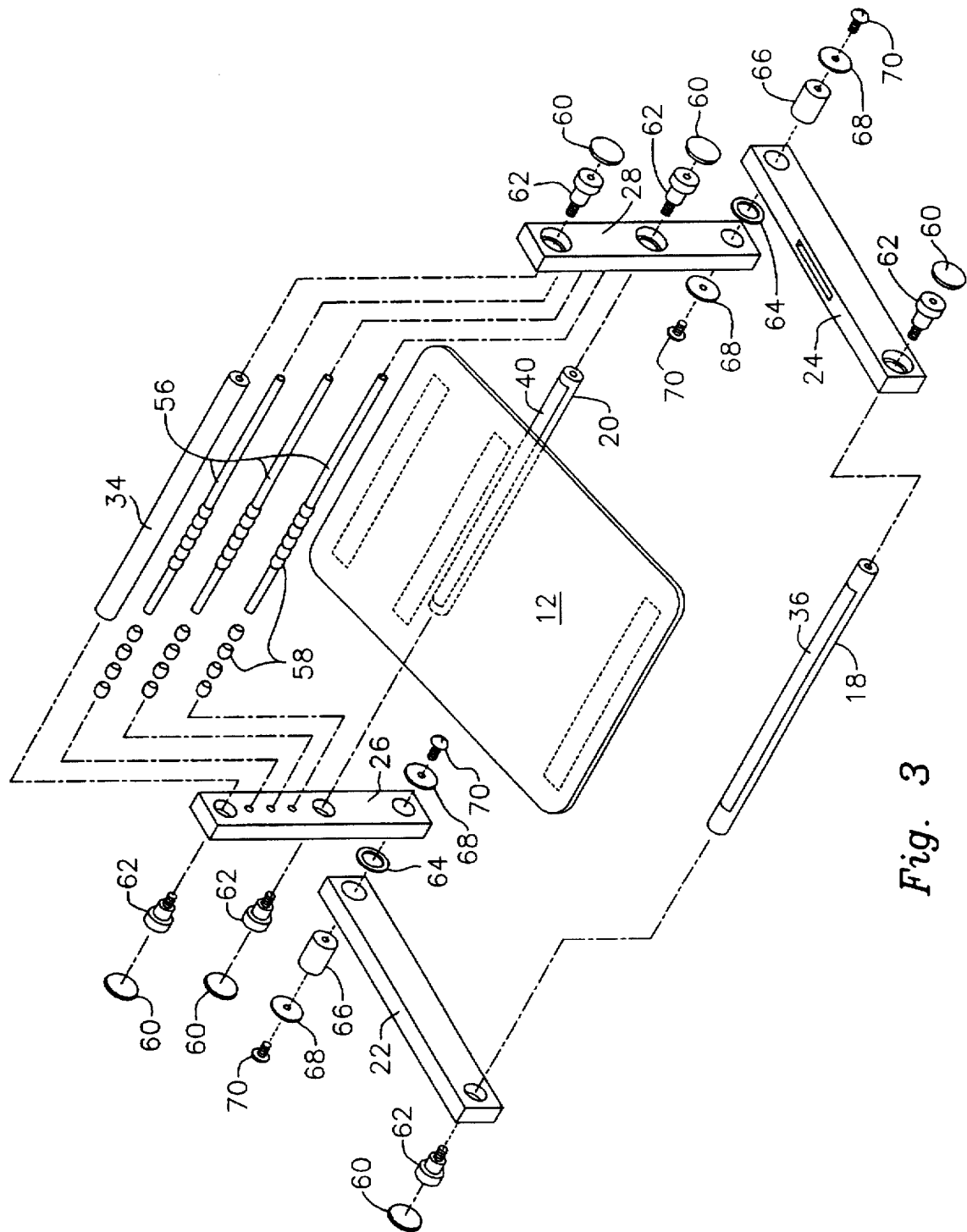
FIG. 3 is an exploded perspective assembly view.

Although anyone of ordinary mechanical skill could make and use the invention from the information provided above, in conjunction with FIGS. 1 and 2, FIG. 3 provides a detailed, exploded assembly view of all of the parts used in constructing the device of said FIGS. 1 and 2. Those items collectively denoted 60 are end caps and are provided primarily for aesthetic purposes. Those items collectively denoted 62 are countersunk screws that extend through countersunk bores formed in frame members 26, 28 and which threadingly engage respective opposite ends of rods 18, 20, and frame member 34. Items 64 and 66 are friction-reducing bushings, items 68 are washers, and items 70 are screws.

It will thus be seen that the objects set forth above, and those made apparent from the foregoing description, are efficiently attained and since certain changes may be made in the foregoing construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. A teaching aid, comprising:

a first pair of parallel, transversely spaced apart frame members, each frame member of said first pair of frame members having a forward end and a rearward end;

a second pair of parallel, transversely spaced apart frame members that are connected to respective rearward ends of said frame members of said first pair of frame members;

a lower support rod having its opposite ends secured to respective forward ends of said first pair of frame members;

an upper support rod having its opposite ends secured to said respective frame members of said second pair of frame members at respective preselected points between opposite ends of said respective frame members of said second pair of frame members;

a writing board supported by said upper and lower support rods;

an abacus means supported by said frame members of said second pair of frame members;

said upper support rod being positioned at an elevation higher than said lower support rod so that said writing board is inclined at a predetermined angle with respect to a horizontal plane when said teaching aid is supported on a horizontal support surface and deployed in an operable configuration.

2. The teaching aid of claim 1, wherein the connection between said first and second pair of frame members is a pivotal connection so that said second pair of frame members is foldable into coplanar relation to said first pair of frame members.

3. The teaching aid of claim 1, wherein said abacus means includes a plurality of parallel rods having their respective opposite ends connected to said second pair of frame members, and a plurality of beads slideably mounted on each of said rods.

4. The teaching aid of claim 1, further comprising fastening means for detachably securing said writing board to said lower and upper support rods when said teaching aid is deployed in said operable configuration.

5. The teaching aid of claim 4, wherein said fastening means includes a strip of hook and loop fastening material secured to said lower and upper support rods and a mating pair of strips of hook and loop fastening material secured in spaced relation to one another to an underside of said writing board in registration with said upper and lower support rods, said mating pair of strips being positioned at opposite ends of said writing board.

6. The teaching aid of claim 5, further comprising means for detachably securing said writing board to said lower and upper support rods when said teaching aid is deployed in a folded configuration.

7. The teaching aid of claim 6, wherein said means for detachably securing said writing board to said lower and upper support rods when said teaching aid is in a folded configuration includes a third strip of hook and loop fastening material secured to an underside of said writing board, said third strip of fastening material being positioned between said pair of strips that are positioned at opposite ends of said writing board and being in registration with said strip of material secured to said upper support rod when said teaching aid is disposed in its folded configuration.

8. The teaching aid of claim 1, further comprising means secured to a preselected frame member of said first pair of frame members for detachably securing a writing pen to said preselected frame member.

9. The teaching aid of claim 8, wherein said means for detachably securing said pen to said preselected frame member includes a strip of hook and loop fastening material secured to said preselected frame member and a mating strip of hook and loop fastening material secured to said pen.

10. The teaching aid of claim 1, wherein said predetermined angle of said writing board is approximately thirty degrees.

11. The teaching aid of claim 1, wherein said writing board is a dry erase board.

12. The teaching aid of claim 1, wherein said writing board is a chalkboard.

13. The teaching aid of claim 1, wherein said writing board is magnetized.

14. The teaching aid of claim 1, wherein said frame members of said first pair of frame members are disposed orthogonally to said frame members of said second pair of frame members when said teaching aid is in said operable configuration and wherein said first and second pairs of frame members are locked into said orthogonal relation with one another by said writing board when said writing board is secured at its opposite ends to said lower and upper support rods.

15. The teaching aid of claim 1, wherein said upper support rod is rotatably mounted relative to said second pair of frame members so that said upper support rod is in a first rotational position when said teaching aid is deployed in said operable configuration and so that said upper support rod is in a second rotational position when said teaching aid is disposed in a folded configuration.

* * * * *